United States Patent
Igarashi

(10) Patent No.: US 7,619,682 B2
(45) Date of Patent: Nov. 17, 2009

(54) TURNING HINGE MECHANISM AND IMAGE PICK UP DEVICE

(75) Inventor: Ei Igarashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 464 days.

(21) Appl. No.: 10/586,398

(22) PCT Filed: Jan. 19, 2005

(86) PCT No.: PCT/JP2005/000592

§ 371 (c)(1),
(2), (4) Date: Jul. 17, 2006

(87) PCT Pub. No.: WO2005/071947

PCT Pub. Date: Aug. 4, 2005

(65) Prior Publication Data

US 2007/0161292 A1    Jul. 12, 2007

(30) Foreign Application Priority Data

Jan. 23, 2004  (JP) ............................ P2004-016276
Jan. 23, 2004  (JP) ............................ P2004-016279

(51) Int. Cl.
*H04N 5/225* (2006.01)

(52) U.S. Cl. ................. 348/373; 348/375; 348/376; 348/220.1; 396/424; 396/419; 386/118

(58) Field of Classification Search ............ 348/373, 348/375, 376, 220.1, 118; 349/165, 31; 396/424, 419; 386/118
See application file for complete search history.

(56) References Cited

U.S. PATENT DOCUMENTS

| 4,575,206 A | 3/1986 | Maeda et al. |
| 4,681,421 A * | 7/1987 | Yamada et al. ............... 396/542 |
| 5,043,822 A | 8/1991 | Ichiyoshi et al. |
| 5,256,075 A * | 10/1993 | Miyahara et al. ............ 439/164 |
| 5,692,589 A * | 12/1997 | Beguin ........................ 192/39 |
| 5,801,774 A | 9/1998 | Seo |
| 5,841,635 A * | 11/1998 | Sadler et al. ................. 361/749 |
| 5,982,429 A | 11/1999 | Kamamoto et al. |
| 6,226,448 B1 | 5/2001 | Takagi et al. |

(Continued)

FOREIGN PATENT DOCUMENTS

EP    0 438 071 A2    7/1991

(Continued)

*Primary Examiner*—David L Ometz
*Assistant Examiner*—Quang V Le
(74) *Attorney, Agent, or Firm*—Oblon, Spivak, McClelland, Maier & Neustadt, L.L.P.

(57) ABSTRACT

There is provided a pivot hinge mechanism to support a main body and grip unit of a video camera pivotably in relation to each other. It includes a stationary plate to be installed to one of the main body and grip unit, rotating plates to be installed to the other of the main body and grip unit, and a spindle to support the rotating plates rotatably in relation to the stationary plate. The stationary plate and each of the rotating plates have formed therein a first and second openings, respectively, through which a harness routed between the main body and grip unit is penetrated. The first and second openings are formed to overlap each other at least partially in an angular range in which the grip unit is pivoted in relation to the main body.

19 Claims, 11 Drawing Sheets

U.S. PATENT DOCUMENTS

| | | |
|---|---|---|
| 6,249,653 B1 | 6/2001 | Itoh et al. |
| 6,328,270 B1 | 12/2001 | Elberbaum |
| 6,357,936 B1 | 3/2002 | Elberbaum |
| 2003/0193783 A1* | 10/2003 | Kosako et al. ............... 361/727 |
| 2003/0200626 A1* | 10/2003 | Kosako et al. ................ 16/337 |
| 2004/0212956 A1* | 10/2004 | Kuivas et al. ............... 361/683 |

FOREIGN PATENT DOCUMENTS

| | | |
|---|---|---|
| EP | 0 926 009 A2 | 6/1999 |
| JP | 2-49280 | 4/1990 |
| JP | 2 108483 | 8/1990 |
| JP | 4-108275 | 4/1992 |
| JP | 4 196773 | 7/1992 |
| JP | 6-95212 | 4/1994 |
| JP | 7-226871 | 8/1995 |
| JP | 8-205010 | 8/1996 |
| JP | 10 65938 | 3/1998 |
| JP | 2003-049823 | 2/2003 |
| JP | 2003 49823 | 2/2003 |
| JP | 2003-49823 | 2/2003 |
| JP | 2004 336718 | 11/2004 |
| JP | 2005-86541 | 3/2005 |

* cited by examiner

TURNING HINGE MECHANISM AND IMAGE PICK UP DEVICE

TECHNICAL FIELD

The present invention relates to a pivot hinge mechanism for supporting a main body and pivotable unit pivotably in relation to each other and an imaging device using such a pivot hinge mechanism to install a grip unit to the main body to be pivotable in relation to the latter.

This application claims the priority of the Japanese Patent Application No. 2004-016276 and No. 2004-016279 filed in the Japanese Patent Office on Jan. 23, 2004, the entireties of which are incorporated by reference herein.

BACKGROUND ART

The imaging devices such as a digital still camera, digital video camera, etc. are designed more compact with all the functions being integrated in the body of the devices. Since shooting is made with the imaging device itself being held, a shape of the imaging device will make it difficult to hold the imaging device or a shooting position or angle will make it difficult to make the shooting from a stable angle.

On this account, it has been proposed to install the grip unit to be held by the user pivotably to the lateral side of the main body with a pivot hinge mechanism so that the angular position of the grip unit in relation to the main body can arbitrarily be changed correspondingly to a shooting position or angle.

Note that between the main body and grip unit, a harness (wiring) is routed through an opening formed in the pivot hinge mechanism. There has been proposed a pivot hinge mechanism of this type constructed as shown in FIG. 16. As shown, the pivot hinge mechanism, generally indicated with a reference numeral 200, includes a stationary plate 201 fixed to a main body, rotating plate 202 fixed to a grip unit and a spindle 203 that supports the rotating plate 202 rotatably in relation to the stationary plate 201. The stationary and rotating plates 201 and 202 have formed therein openings 205 and 206, respectively, through which there is penetrated a harness 204 routed between the main body and grip unit.

The harness 204 is formed from a long flexible printed circuit board (FPC) having a predetermined width. It has an excess portion 204a of such a sufficient length greater than a minimum necessary length for the routing that the harness 204 can follow up the pivoting of the grip unit and the harness can easily be routed between the main body and grip unit. As shown in FIG. 17, the harness 204 is folded back with the excess portion 204a being laid between the stationary and rotating plates 201 and 202, while being routed at one-end side thereof through the opening 205 in the stationary plate 201 to the main body and at the other-end side thereof through the opening 206 in the rotating plate 202 to the grip unit.

In the above conventional pivot hinge mechanism 200, since the folded-back width of the harness 204 depends upon a gap S formed between the stationary and rotating plates 201 and 202, it should be smaller when the gap S is reduced for a reduced thickness of the entire pivot hinge mechanism 200. However, the reduction of the folded-back width will result in a reduced bending resistance and reduced degree of freedom of routing of the flexible printed circuit board. Especially, in case a double-side flexible printed circuit board is used as the harness, the larger number of wires therein will lead to an increased hardness of the harness itself as compared with the one-side flexible printed circuit board. In this case, when the excess portion 204a of the harness 204 lacking the bending resistance is folded back at the narrow gap S between the stationary and rotating plates 201 and 202, the harness 200 cannot follow up the rotation of the rotating plate 202 in relation to the stationary plate 201 with the result that the harness 204 will be broken along the folding line and the flexible printed circuit board itself will be broken.

Also, in the imaging device having a pivotable grip unit, the grip unit should be held stably in an arbitrary angular position in relation to the main body. On this account, it has been proposed to provide a friction mechanism that will give a friction to between the main body and grip unit. However, such a friction mechanism will cause the imaging device to be larger in size and also will interfere with the harness routed between the main body and grip unit.

DISCLOSURE OF THE INVENTION

It is therefore desirable to overcome the above-mentioned drawbacks of the related art by providing an improved and novel pivot hinge mechanism and imaging device.

It is also desirable to provide a pivot hinge mechanism permitting to maintain the degree of freedom of the harness routed between a main body and pivotable unit and facilitate the routing of the harness.

It is also desirable to provide a pivot hinge mechanism that can support the pivotable unit pivotably in relation to a main body and hold the pivotable unit appropriately and stably in an arbitrary angular position in relation to the main body.

It is also desirable to provide an imaging device designed more compact and in which the degree of freedom of the harness routed between a main body and grip unit is maintained to prevent the harness from being broken or discontinued.

It is also desirable to provided an imaging device in which the grip unit can be held appropriately and stable in an arbitrary angular position in relation to a main body.

According to the present invention, there is provided a pivot hinge mechanism supporting a main body and pivotable unit pivotably in relation to each other, the pivot hinge mechanism including a stationary plate installed to one of the main body and pivotable unit, rotating plates installed to the other of the main body and pivotable unit, and a spindle supporting the rotating plates rotatably in relation to the stationary plate, the stationary and rotating plates having formed therein openings through which a harness routed between the main body and rotating portion is penetrated, and the opening in the stationary plate and those in the rotating plates being formed for at least a part thereof to overlap each other in an angular range in which the pivotable unit is pivoted in relation to the main body.

The above pivot hinge mechanism according to the present invention further includes a first friction mechanism and second friction mechanism, which give friction to between the rotating and stationary plates at the inner and outer walls thereof.

According to the present invention, there is also provided an imaging device including a main body having provided therein an imaging unit to capture an image of an object, a grip unit having provided therein a recording unit to record the image captured by the imaging unit and installed pivotably to one side of the main body, and a pivot hinge mechanism supporting the main body and pivotable unit pivotably in relation to each other, the pivot hinge mechanism including a stationary plate installed to one of the main body and pivotable unit, rotating plates installed to the other of the main body and pivotable unit, and a spindle supporting the rotating plates rotatably in relation to the stationary plate, the stationary and rotating plates having formed therein openings through which a harness routed between the main body and rotating portion is penetrated, and the opening in the stationary plate and those in the rotating plates being formed for at least a part thereof to overlap each other in an angular range in which the pivotable unit is pivoted in relation to the main body.

The above imaging device according to the present invention further includes a first friction mechanism and second friction mechanism, which give friction to between the rotating and stationary plates at the inner and outer walls thereof.

Since the openings in the stationary and rotating plates are formed for at least a part thereof to overlap each other in a range of angle in which the pivotable unit is pivoted in relation to the main body, the pivot hinge mechanism according to the present invention permits to bend the harness routed between the main body and pivotable unit gently between the openings formed in the stationary and rotating plates to overlap each other.

Further, the first and second fiction mechanisms to give friction to the inner and outer walls between the rotating and stationary plates contribute to appropriate and stable holding of the pivotable unit at an arbitrary angle in relation to the main body.

In the imaging device provided with the above pivot hinge mechanism, the degree of freedom of the harness routed between the main body and grip unit can be maintained and the harness can easily be routed. Also, the imaging device can designed more compact, and the harness can be prevented from being caught, broken or discontinued when the grip unit is pivoted in relation to the main body. Especially, a double-side flexible printed circuit board is usable very effectively as the harness because the larger number of wires therein will lead to an increased hardness of the harness itself as compared with the one-side flexible printed circuit board.

The foregoing and other features, aspects and advantages of the present invention will be come apparent from the following detailed description of the present invention when taken in conjunction with the accompanying drawings.

BEST MODE FOR CARRYING OUT THE INVENTION

The present invention will be explained in detail herebelow concerning the pivot hinge mechanism and imaging device with reference to the accompanying drawings.

Figure 1:
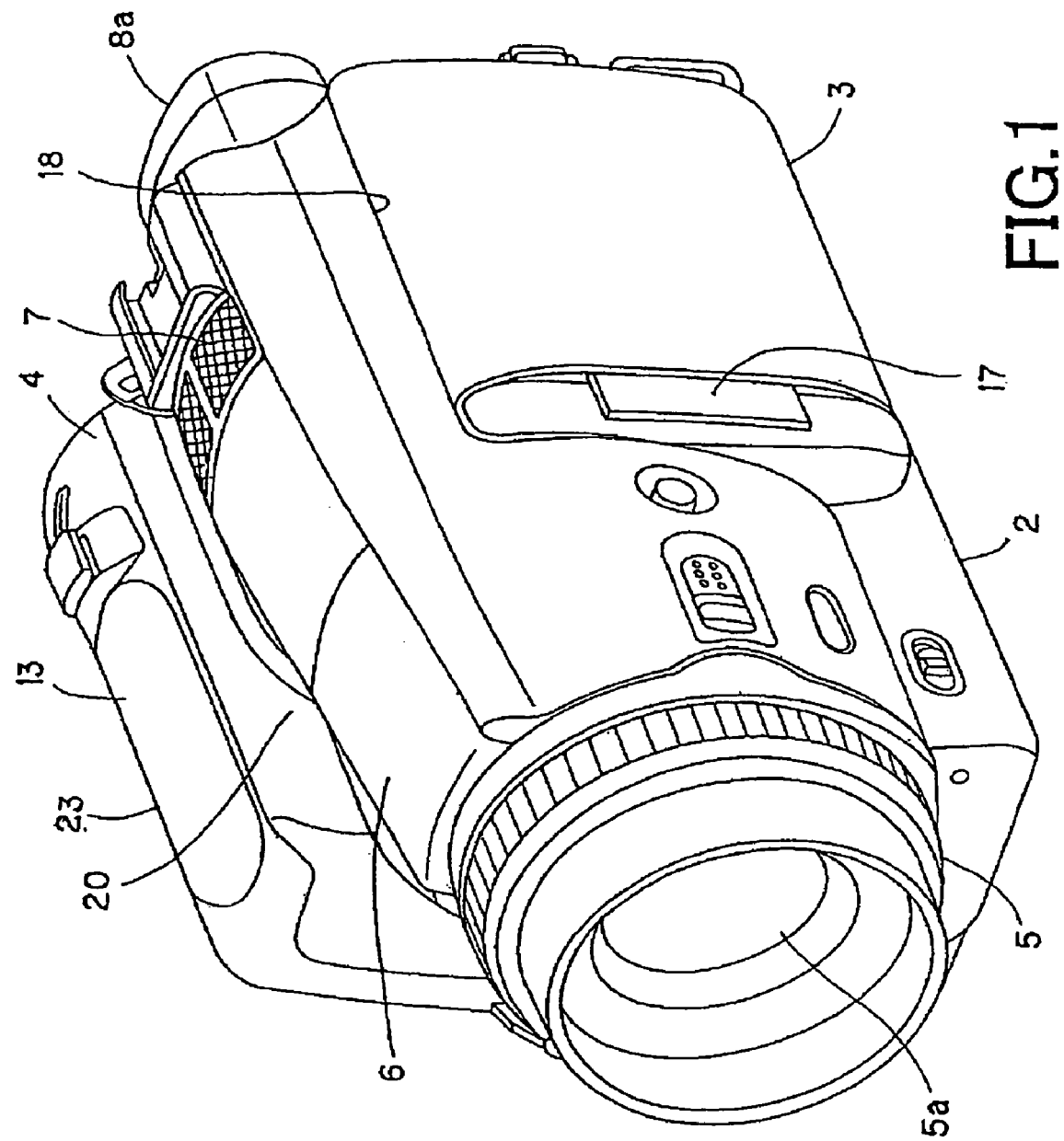
FIG. 1 is a perspective view, from the front side, of a digital video camera according to the present invention.
Figure 2:
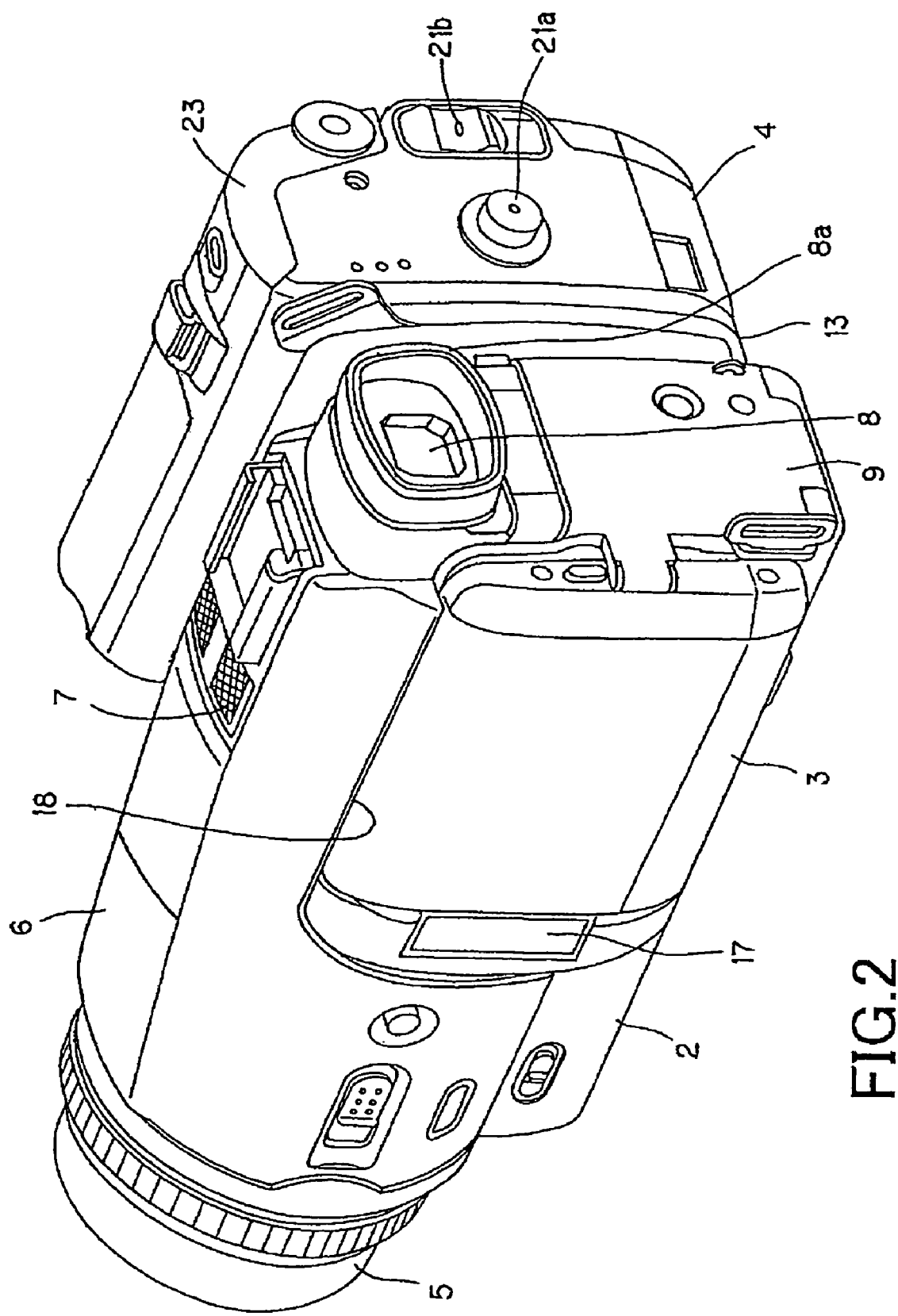
FIG. 2 is also a perspective view, from the rear side, of the digital video camera.

The imaging device according to the present invention is, for example, a combination of a camera and digital video tape recorder (will be referred to as "digital video camera" hereunder) shown in FIGS. 1 and 2. The digital video camera is generally indicated with a reference numeral 1. As shown, the digital video camera 1 includes a main body 2, a display panel 3 so installed to one side of the main body 2 that it can be closed and opened, and a grip unit 4 installed pivotably to the other side of the main body 2, opposite to the display panel 3.

The main body 2 includes an imaging unit to capture an image of an object. It has a protruding lens unit 5 mounted at the front of the main body 2 and whose imaging lens 5a is exposed to outside. Also, on the top of the main body 2, there is provided a flash unit 6 that can be popped up and illuminate a flash lamp in shooting at night or in a dark place. On the top of the main body 2, there is also provided at the back of the flash unit 6 a stereo microphone 7 to record a voice and sound. Further, various control buttons and switches are provided in appropriate places on the main body 2.

Note that the main body 2 has built therein a lens barrel incorporating an imaging optical system including the imaging lens 5a and image pickup devices to capture an image of the object, formed by the lens barrel, such as a CCD (charge-coupled device), CMOS (complementary metal-oxide semiconductor device) or the like. In the imaging unit, an image acquired through the imaging lens 5a is converted by the image pickup device into an electric data and the electric data is supplied as image data to a recorder/reproducer, display unit, etc. which will be described in detail later.

At the upper portion of the rear side of the main body 2, there is provided a viewfinder (EVF: electronic viewfinder) 8 having an eyecup 8a. The viewfinder 8 is a display unit at the main body side and displays an image captured by the aforementioned imaging unit. The user can view the image displayed on an internal liquid crystal display (LCD) through the eyecup 8a.

Figure 6:
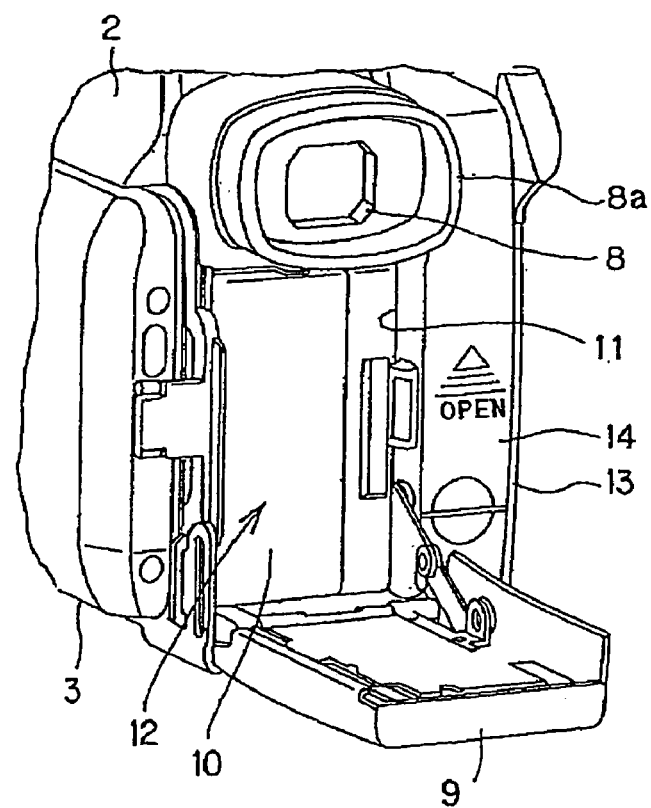
FIG. 6 is a perspective view of the substantial portion of the digital video camera with a battery unit being housed.

As shown in FIGS. 2 and 6, at the lower portion of the rear side of the main body 2, there are provided a battery insertion opening 10 through which a battery 9 is inserted or removed, battery housing 11 to accommodate the battery 9 inserted through the battery insertion opening 10, and a lid 12 to close the battery insertion opening 10. In this digital video camera 1, the battery 9 can be housed inside the may body 2.

Figure 3:
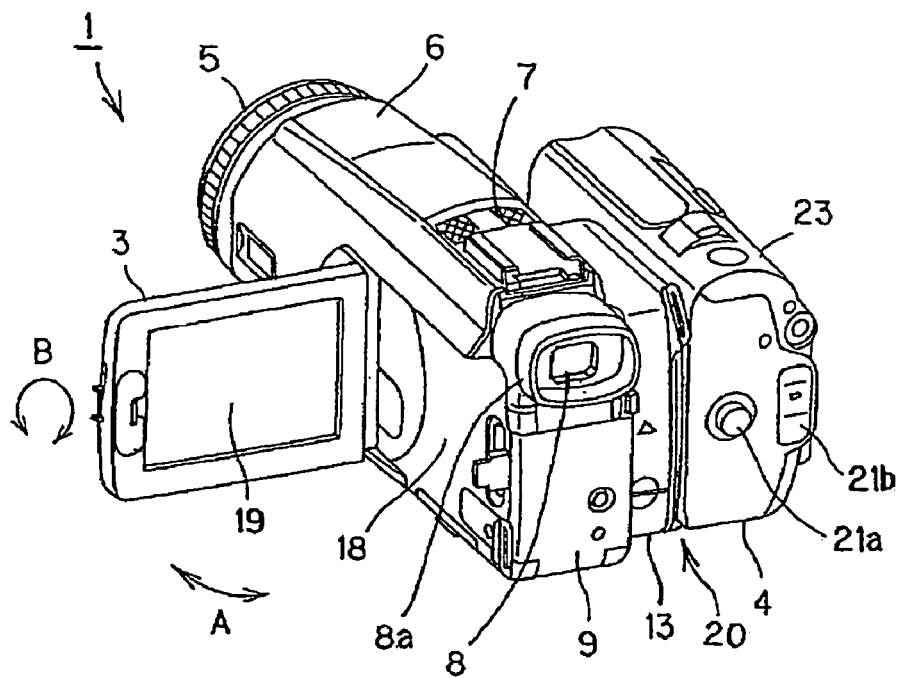
FIG. 3 is a perspective view of the digital video camera with the display panel being opened.
Figure 7:
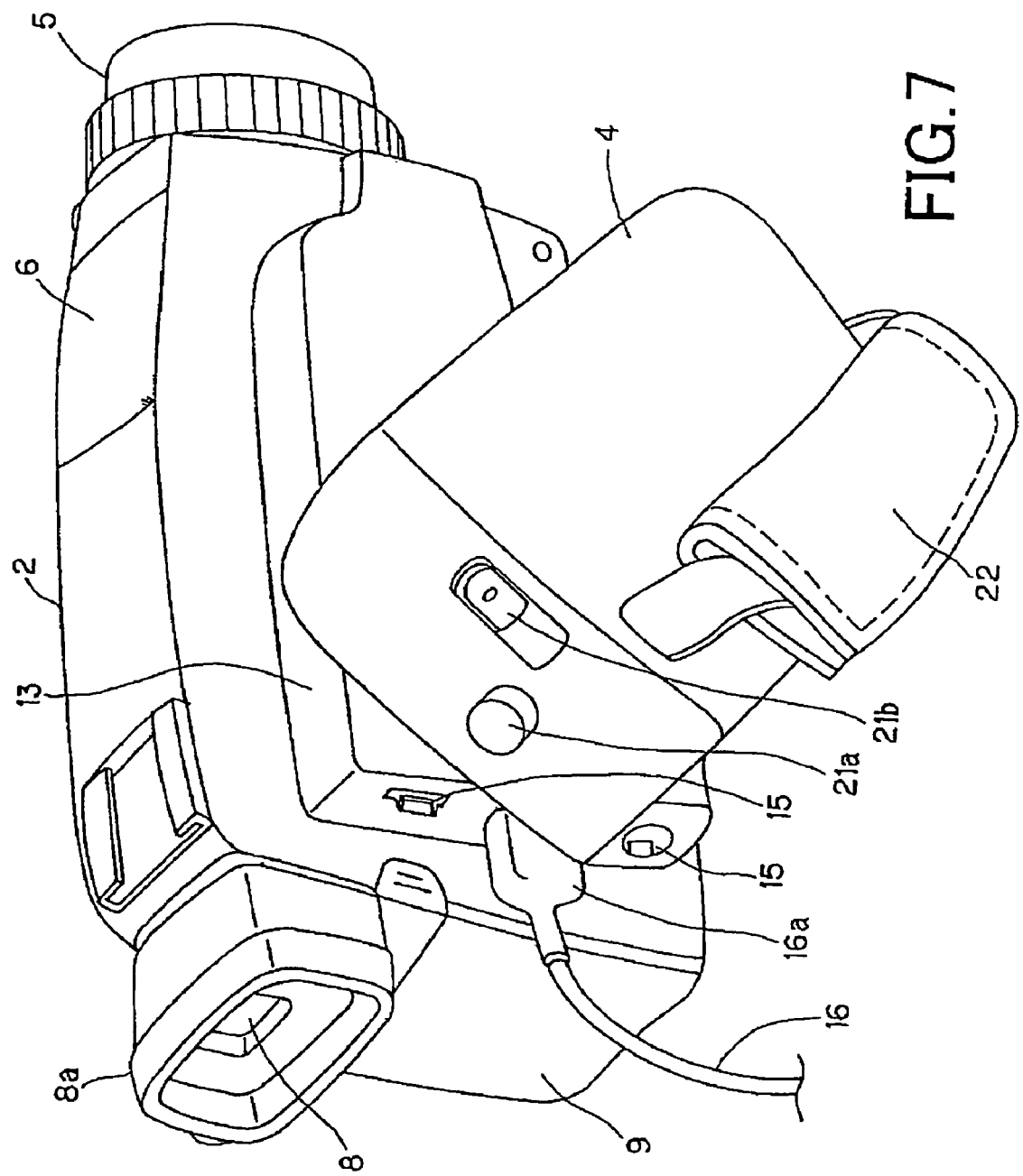
FIG. 7 is a perspective view of the digital video camera with the connecting cord being plugged in the connector.

As shown in FIGS. 3, 6 and 7, a coupling 13 is provided between the main body 2 and grip unit 4 and a connector cover 14 is so installed to the rear side of the coupling 13 that it can be closed and opened. Inside the connector cover 14, there are provided a connector block 15 including a headphone output terminal and microphone input terminal to which, for example, a headphone and microphone are to be connected, video/audio input and output terminals for input/output of video and audio signals from/to any other electronic apparatus such as a personal computer, power receptacle for connection to an external power source (AC adapter), etc. Therefore, a plug 16a of a connecting cord 16 is to be so connected from outside to the connector block 15 provided at the back of the coupling 13 that the plug 16a will be nearly parallel to the optical axis of the imaging lens 5a.

As shown in FIGS. 2 and 3, the display panel 3 is installed pivotably to the main body 2 with a biaxial pivot hinge mechanism 17. The hinge mechanism 17 supports the display panel 3 pivotably in an angular range of about 90 deg. in the opening/closing direction as indicated with an arrow A in FIG. 3 in relation to the main body 2 and also in an angular range of about 270 deg. about an axis perpendicular to the opening/closing direction as indicated with an arrow B in FIG. 3. Thus, the display panel 3 can be turned around while being closed or opened in relation to the main body 2. Also, being closed in relation to the main body 2, the display panel 3 can be accommodated in a display panel receiver 18 formed in one lateral side of the main body 2.

Further, on one main side of the display panel 3, there is provided a liquid crystal display (LCD) panel 19 that displays an image captured by the aforementioned imaging unit.

The LCD panel 19 is used as a display unit at the display panel side. In this digital video camera 1, an image captured through the imaging lens 5a can be displayed on the LCD panel 19 as well as on the viewfinder 8. It should be noted that a touch panel is provided on the front surface of the LCD panel 19. By pressing the touch panel with a finger while viewing an image displayed on the LCD panel 19, the user can operate the digital video camera 1 in various manners.

Figure 4:
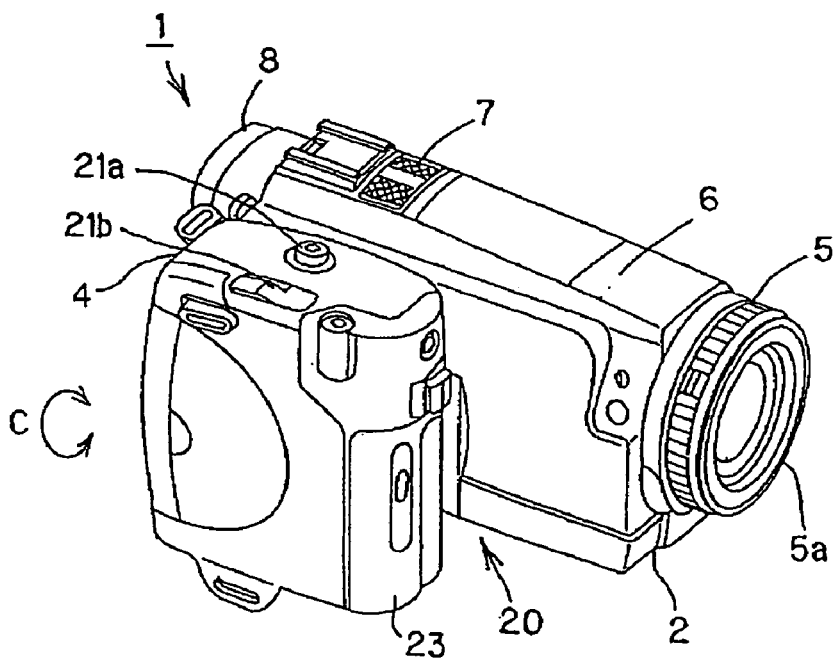
FIG. 4 is a perspective view of the digital video camera with the grip unit being pivoted.

As shown in FIGS. 2, 4 and 7, the grip unit 4 is to be held by the user of the digital video camera 1. It is installed pivotably to the coupling 13 of the main body 2 with a pivot hinge mechanism 20. The pivot hinge mechanism 20 supports the grip unit 4 to the main body 2 to be pivotable in an angular range of about 90 deg. about an axis perpendicular to the optical axis indicated with an arrow C in FIG. 4. Therefore, in the digital video camera 1, the grip unit 4 can continuously be changed in direction relative to the main body 2 correspondingly to a position, angle, etc. of shooting.

Note that in appropriate places on the grip unit 4, there are provided a shutter button 21a, zoom lever 21b, etc. operable by the user for operating the digital video camera 1 in various manners while holding the grip unit 4. Also, to the lateral side of the grip unit 4, there is secured a grip belt 22 that will immobilize the user's hand holding the grip unit 4.

Figure 5:
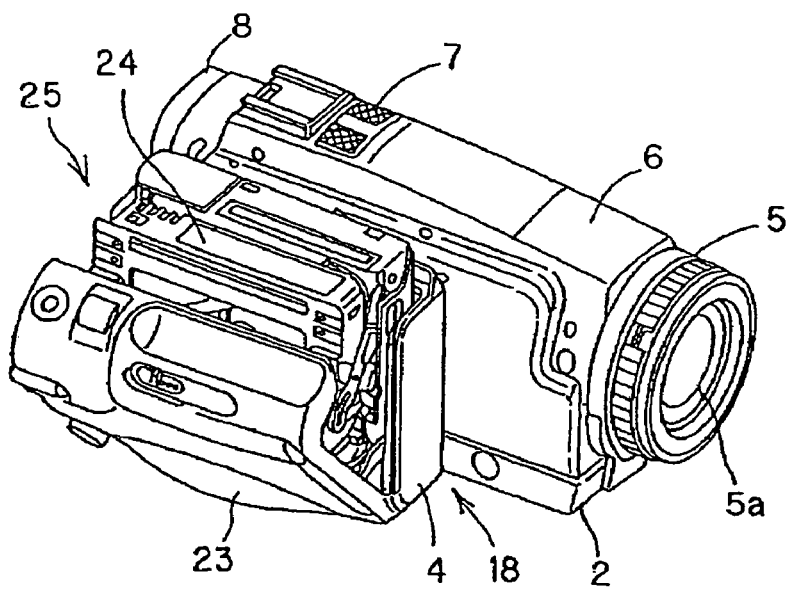
FIG. 5 is a perspective view of the digital video camera with the grip unit being opened.

Also, the grip unit 4 has installed thereto a lid 23 that forms a part of the body of the grip unit 4 as shown in FIG. 5. The lid 23 can be closed and opened. Inside the lid 23, there is provided a mechanical deck 25 in which a tape cassette 24 is to be set. It should be noted that the mechanical deck 25 is a recording/reproducing unit to record a video signal, audio signal or the like supplied from the imaging unit and sound recording unit or reproducing a video signal, audio signal or the like recorded on a tape cassette. The mechanical deck 25 includes a rotating head unit to record or reproduce a signal to or from a magnetic tape in the tape cassette 24 set in the mechanical deck 25, a tape feeding mechanism to drive the magnetic tape at a constant velocity while pinching, between a pinch roller and capstan, the magnetic tape guided by a plurality of guide rollers, etc.

With the digital video camera 1 constructed as above, the user can pickup a moving picture, still picture or the like while viewing an object through the viewfinder 8 located at the rear side of the main body 2 or viewing the LCD panel 19 of the display panel 3 while holding the grip unit 4.

For example, by changing the direction of the display panel 3 in relation to the main body 2 of the digital video camera 1, the user can pick up an image of himself or herself while viewing the LCD panel 19.

Further, by changing the direction of the grip unit 4 of the digital video camera 1 in relation to the main body 2 correspondingly to a shooting position or angle, the user can hold the grip unit 4 more easily and can thus make a shooting at a stable angle. Especially, the grip unit 4 turned to a position of 90 deg. as shown in FIG. 4 from a position of zero angle as shown in FIG. 1 will has such a positional relation with the main body 2 that the digital video camera 1 can function as a single-lens reflex camera, which will facilitate the user to pick up a still picture.

Also, the digital video camera 1 includes the connector block 15 whose external terminal is inserted into the coupling 13 that couples the main body 2 and grip unit 4 with each other as shown in FIG. 6. So, it is possible to prevent the plug 16a inserted into the connector block 15 and connecting cord 16 extending from the plug 16a from interfering with the grip unit 4 being pivoted in relation to the main body 2. This feature will further improve the usability of the digital video camera 1.

Next, the pivot hinge mechanism 20 according to the present invention, to support the aforementioned main body 2 and grip unit 4 pivotably in relation to each other, will be explained.

Figure 8:
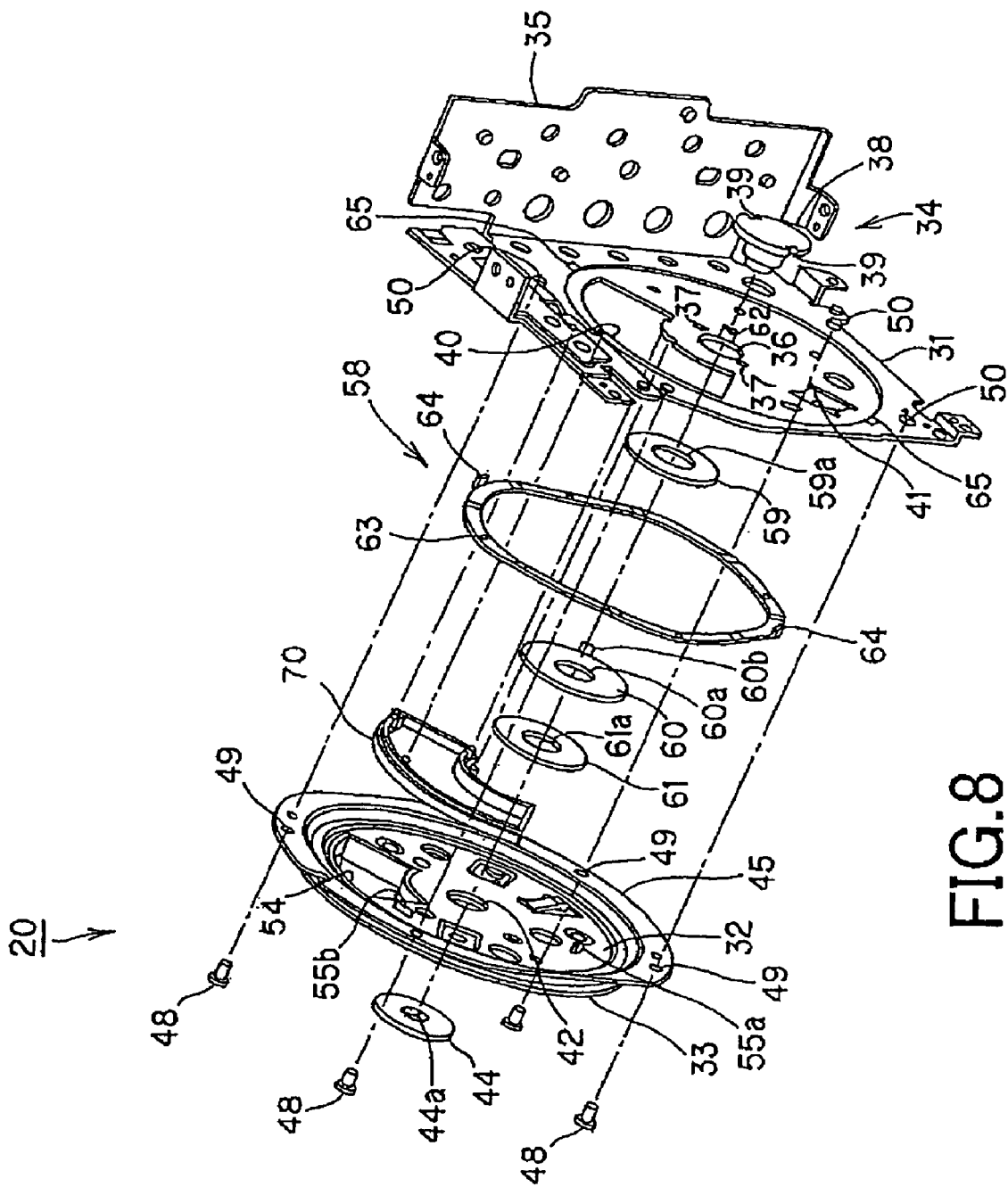
FIG. 8 is an exploded perspective view of the pivot hinge mechanism according to the present invention.
Figure 9:
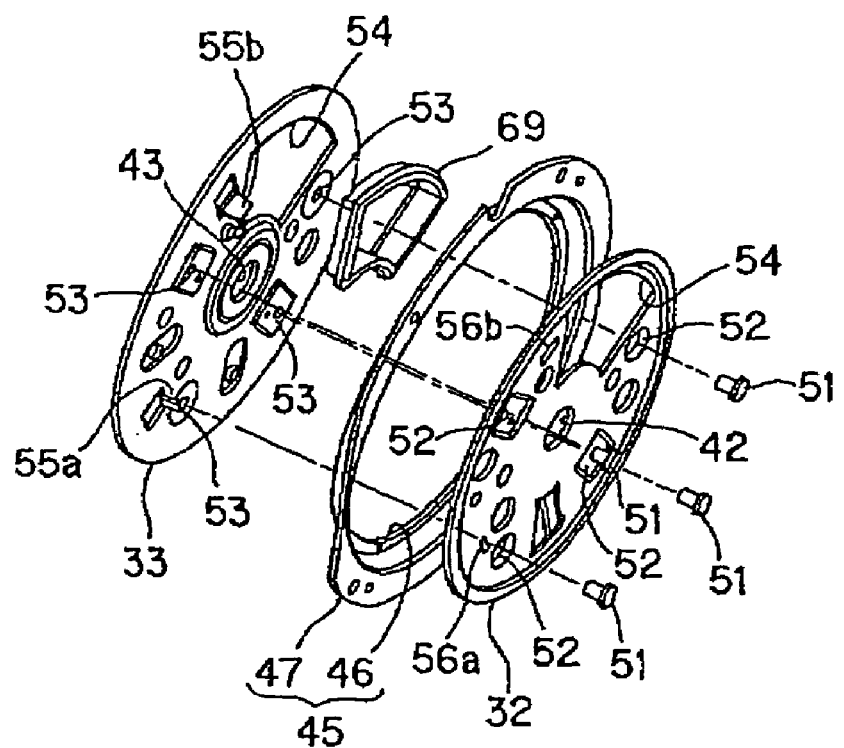
FIG. 9 is also an exploded perspective view of the substantial portion of the pivot hinge mechanism.
Figure 10:
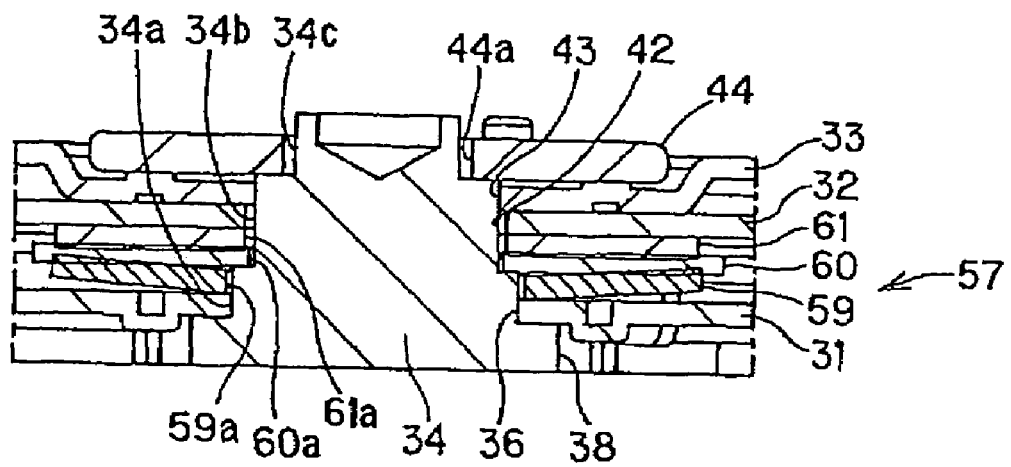
FIG. 10 is a sectional view of the substantial portion of the pivot hinge mechanism.

As shown in FIGS. 8, 9 and 10, the pivot hinge mechanism 20 includes a stationary plate 31 to be installed to the grip unit 4 and a pair of rotating plates 32 and 33 to be installed to the main body 2. With the pair of rotating plates 32 and 33 being supported rotatably about a spindle 34 installed to the stationary plate 31, the pivot hinge mechanism 20 can support the main body 2 and grip unit 4 pivotably in relation to each other.

More particularly, the stationary plate 31 is formed from a nearly square metal sheet to have a bend 35 along one side thereof. The bend 35 has a right angle in relation to the main side of the stationary plate 31. The stationary plate 31 is installed to the grip unit 4 with the bend 35 being screwed to the lateral side of the mechanical deck 25.

Also, the stationary plate 31 has formed nearly in the center thereof a spindle hole 36 through which a spindle 34 is penetrated and around which a pair of positioning pins 37 that prevents rotation of the spindle 34 is formed to project from the main side of the stationary plate 31. The spindle 34 has provided at the base end thereof a flange 38 projected in a direction in which the diameter is larger. The flange 38 has formed therein a pair of positioning concavities 39 in which the pair of positioning pins 37 is to be engaged, respectively. Being penetrated through the spindle hole 36 and with the pair of positioning pins 37 being engaged in the pair of positioning concavities 39, respectively, the spindle 34 is positioned in relation, and fixed, to the stationary plate 31. The spindle 34 includes a first portion 34a nearly equal in diameter to the spindle hole 36, second portion 34b smaller in diameter than the first spindle portion 34a, and a third portion 34c smaller in diameter than the second spindle portion 34b.

The stationary plate 31 has formed therein a first opening 40 through which a harness 66 which will be explained in detail later is to be penetrated. The first opening 40 is formed to have a nearly circular shape sufficiently wide for penetration of the harness 66 and extending divergently in an angular range of approximately 90 deg. about the spindle 34 penetrated through the spindle hole 36.

Also, the stationary plate 31 has formed thereon a projecting stopper 41 to limit the angular range in which the grip unit 4 is pivoted in relation to the main body 2. The projecting stopper 41 is formed by punching the stationary plate 31 to project from the other main side of the stationary plate 31.

The rotating plates 32 and 33 in pair are formed from a generally square metal sheet and have formed in the center thereof spindle holes 42 and 43 nearly equal in diameter to the second portion 34*b* of the spindle 34. That is, the pair of rotating plates 32 and 33 is pivotably supported on the spindle 34 with the second spindle portion 34*b* being penetrated through the spindle holes 42 and 43. Also, the spindle 34 has installed to the free end thereof a nearly cylindrical keep plate 44 that prevents the pair of rotating plates 32 and 33 from being disengaged. The keep plate 44 has a hexagonal hole 44*a* formed in the center thereof. Press-fitted in the hexagonal hole 44*a*, the third portion 34*c* of the spindle 34 is fixed to the fee end of the spindle 34.

The pair of rotating plates 32 and 33 has the central portion thereof supported rotatably on the spindle 34 and are positioned for their periphery to catch a peripheral annular plate 45. The peripheral annular plate 45 is formed from a metal sheet including a circular ring portion 46 caught between the rotating plates 32 and 33 in pair and a flange portion 47 projecting from the periphery of the ring portion 46 toward the stationary plate 31 and in a direction in which the diameter is larger. Also, the flange portion 47 has formed therein a plurality of through-holes 49 through which screws 48 are penetrated. On the other hand, the stationary plate 31 has formed therein screw holes 50 corresponding to the plurality of through-holes 49. The peripheral annular plate 45 is installed to the stationary plate 31 with the screws 48 being driven into the screw holes 50 in the stationary plate 31 through the through-holes 49 in the flange portion 47.

Of the pair of rotating plates 32 and 33, the first one (32) disposed inside the peripheral annular plate 45 has formed therein a plurality of through-holes 52 through which screws 51 are to be penetrated. The second rotating plate 33 disposed outside the peripheral annular plate 45 has formed therein screw holes 53 corresponding to the plurality of through-holes 52. With the screws 51 penetrated through the through-holes 52 in the first rotating plate 32 being driven into the screw holes 53 in the second rotating plate 33 through inside the ring portion 46 of the peripheral annular plate 45, the pair of rotating plates 32 and 33 is installed integrally while holding tight the ring portion 46 of the peripheral annular plate 45 between them. It should be noted that the second rotating plate 33 is installed by screwing to the main body 2.

The pair of rotating plates 32 and 33 has formed therein a second opening 54 through the harness 66 is to be penetrated. The second opening 54 is formed to have a generally circular shape sufficiently wide for penetration of the harness 66 and extending divergently in an angular range of approximately 45+α deg. about the spindle 34. The angle α is an overlap angle which will be explained in detail later.

Of the pair of rotating plats 32 and 33, the second one (33) has formed thereon a pair of limiting pieces 55*a* and 55*b* that abut the projecting stopper 41 of the stationary plate 31. The limiting pieces 55*a* and 55*b* in pair are disposed to form an angle of approximately 90 deg. about the spindle 34. The second rotating plate 33 is punched to bend toward the main side opposite to the first rotating plate 32. On the other hand, the first rotating plate 32 has formed therein a pair of openings 56*a* and 56*b* through which the pair of limiting pieces 55*a* and 55*b* is to be penetrated.

In this pivot hinge mechanism 20, when the pair of rotating plates 32 and 33 has been rotated about the spindle 34 in one direction relative to the stationary plate 31, one of the limiting pieces (55*a*) abuts one end of the projecting stopper 41. When the pair of rotating plates 32 and 33 has been rotated about the spindle 34 in the other direction relative to the stationary plate 31, the other limiting piece 55*b* will abut the other end of the projecting stopper 41. Thus, the angular range in which the grip unit 4 is pivoted in relation to the main body 2 is limited to about 90 deg.

The pivot hinge mechanism 20 further includes first and second friction mechanisms 57 and 58 to stably hold the grip unit 4 in relation to the main body 2 in a position of an arbitrary angle in which the grip unit 4 is pivoted in relation to the main unit 2.

The first friction mechanism 57 includes a leaf spring 59, pressing plate 60 and friction plate 61, disposed with the spindle 34 being penetrated, to generate friction at the inner periphery between the stationary plate 31 and first rotating plate 32.

The leaf spring 59 is formed from a nearly circular metal sheet and has formed in the center thereof a through-hole 59*a* nearly equal in diameter to the first portion 34*a* of the spindle 34. It has a thickness-directional section having a nearly countersink shape. Namely, it is a so-called spring washer.

The pressing plate 60 is formed from a nearly circular metal sheet nearly equal in diameter to the leaf spring 59, and has formed in the center thereof a through-hole 60*a* nearly equal in diameter to the second portion 34*b* of the spindle 34. Also, the pressing plate 60 has formed on the periphery thereof a positioning piece 60*b* that prevents rotation of the pressing plate 60. The positioning piece 60*b* is bent at right angle in relation to the main side of the pressing plate 60. The stationary plate 31 has provided therein a concavity 62 formed by cutting a part of the inner circumference of the spindle hole 36. With the second portion 34*b* of the spindle 34 being penetrated through the through-hole 60*a* and positioning piece 60*b* being engaged in the concavity 62 in the stationary plate 31, the pressing plate 60 is positioned in relation, and fixed, to the stationary plate 31 while catching the leaf spring 59 between itself and stationary plate 31.

The friction plate 61 is formed from a nearly circular high-friction sheet material nearly equal in diameter to the pressing plate 60, and has formed in the center thereof a through-hole 61*a* nearly equal in diameter to the second portion 34*b* of the spindle 34. The friction plate 61 is disposed being caught between the first rotating plate 32 and pressing plate 60 with the second portion 34*b* of the spindle 34 being penetrated through the through-hole 61*a*.

Therefore, in the first friction mechanism 57, the leaf spring 59 compressed between the stationary plate 31 and first rotating plate 32 presses the pressing plate 60, and the pressing plate 60 thus pressed will be forced to the friction plate 61, whereby an appropriate friction can be generated.

In order to generate a friction outside between the stationary plate 31 and first rotating plate 32, the second friction mechanism 58 includes a leaf spring 63 disposed being compressed along with the ring portion 46 of the peripheral annular plate 45 between the stationary plate 31 and periphery of the first rotating plate 32.

The leaf spring 63 is formed from a nearly annular metal sheet nearly equal in diameter to the ring portion 46 of the peripheral annular plate 45, and waved as a whole in the direction of thickness. Also, in a position where the periphery of the lead spring 63 is generally bisected, there is formed a pair of positioning pieces 64 that prevents rotation of the leaf spring 63. Each of the positioning piece 64 is bent at right angle toward the main side of the leaf spring 63. The stationary plate 31 has formed therein a pair of positioning holes 65 in which the pair of positioning pieces 64 is engaged. Being caught between the stationary plate 31 and first rotating plate 32 and with the pair of positioning pieces 64 being engaged in the pair of positioning holes 65, the leaf spring 63 is positioned in relation, and fixed, to the stationary plate 31.

In the second friction mechanism 58, the leaf spring 63 compressed between the stationary plate 31 and periphery of the first rotating plate 32 presses the first rotating plate 32 which is thus forced at the periphery thereof to the ring portion 46 of the peripheral annular plate 45, whereby an appropriate friction can be generated.

In the pivot hinge mechanism 20, there are provided the first and second friction mechanisms 57 and 58 to support the main body 2 and grip unit 4 pivotably in relation to each other and give a friction to inside and outside between the stationary plate 31 and first rotating plate 32. Thus, the grip unit 4 can be held appropriately and stably in an arbitrary angular position in relation to the main body 2.

Also in the pivot hinge mechanism 20, even in case the first and second friction mechanisms 57 and 58 are provided, the harness 66 can easily be routed between the main body 2 and grip unit 4 through the first and second openings 40 and 54 and the friction mechanisms will not interfere with the routing of the harness 66 between the main body 2 and grip unit 4.

Further, a detent mechanism provided, if any, in the pivot hinge mechanism 20 to give a detent when the grip unit 4 is pivoted will assure to keep the friction constant without any influence on forcing of the inner leaf spring 59 and outer leaf spring 63.

Therefore, the entire digital video camera 1 including such a pivot hinge mechanism 20 can be designed more compact and the grip unit 4 can be held appropriately and stably in an arbitrary angular position in relation to the main unit 2.

Figure 11:
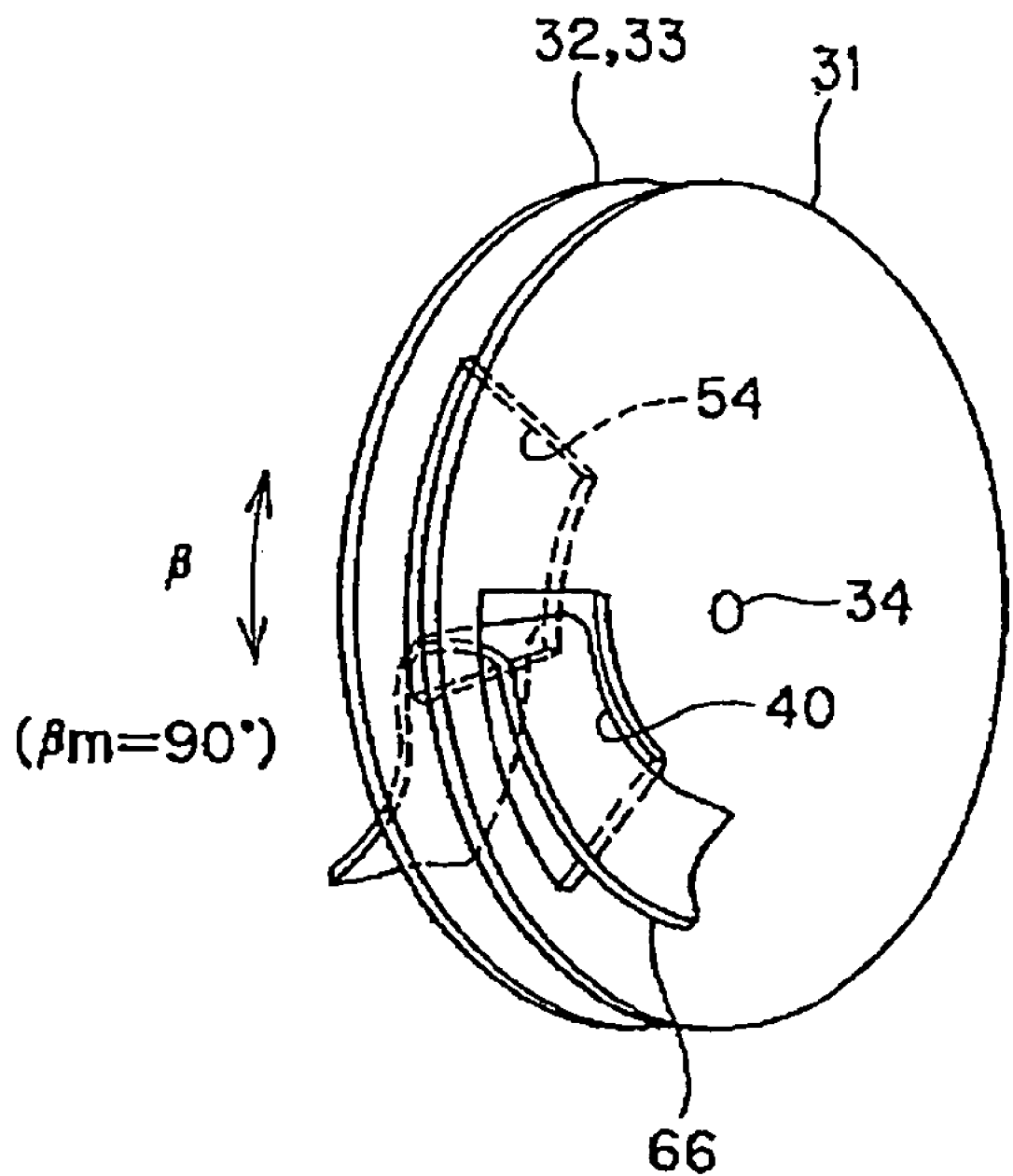
FIG. 11 is a schematic perspective view of the pivot hinge mechanism.

As shown in FIG. 11, in the digital video camera 1, the harness 66 for electrical connection between the main body 2 and grip unit 4 is routed between inside the main body and 2 and inside the grip unit 4 through the first and second openings 40 and 54 in the pivot hinge mechanism 20.

Figure 12:
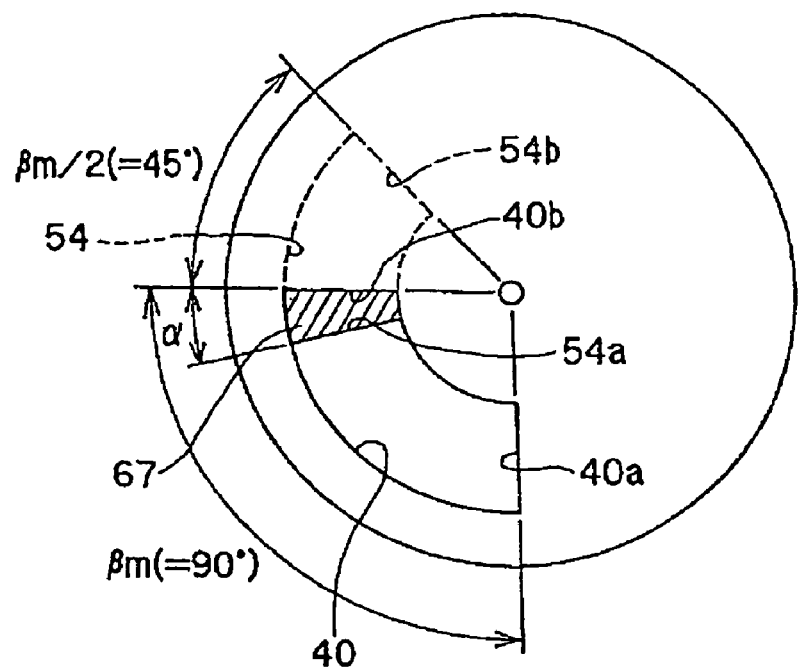
FIG. 12 is a schematic plan view of the pivot hinge mechanism.
Figure 13:
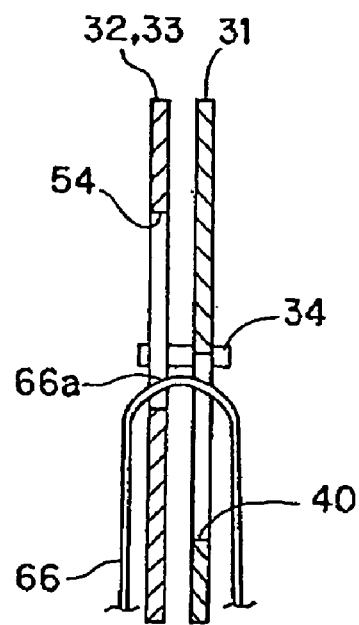
FIG. 13 is a schematic sectional view of the pivot hinge mechanism.

The first and second openings 40 ad 54 are formed to overlap each other at least partially in an angular range (90 deg. herein) in which the grip unit 4 is pivoted in relation to the main body 2 as shown in FIGS. 12 and 13.

In this case, the harness 66 routed between the main body 2 and grip unit 4 can be gently folded back between the first and second openings 40 and 54 overlapping each other at least partially (will be referred to as "overlapping zone 67" hereunder), and can easily be routed through the overlapping zone 67.

Figure 14:
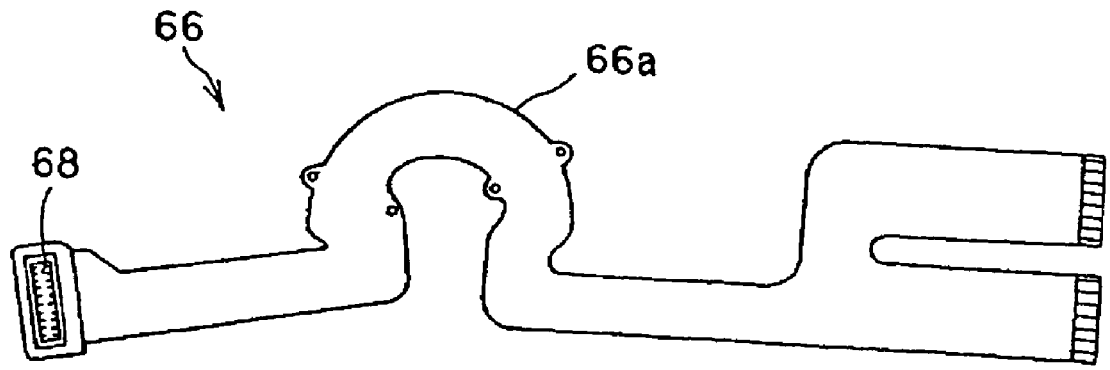
FIG. 14 is a plan view of the flexible printed circuit board.
Figure 15:
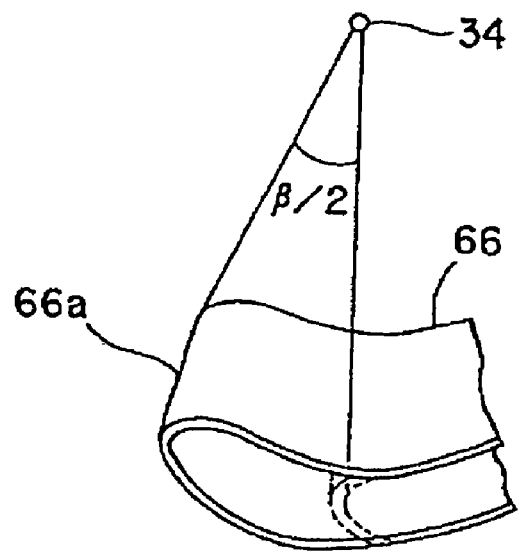
FIG. 15 is a perspective view of the substantial portion of the flexible printed circuit board being bent.
Figure 16:
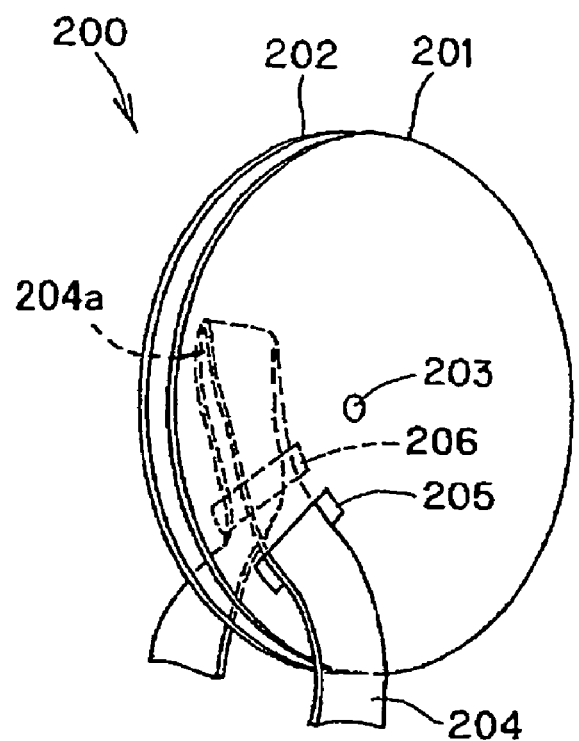
FIG. 16 is a perspective view of the conventional pivot hinge mechanism.
Figure 17:
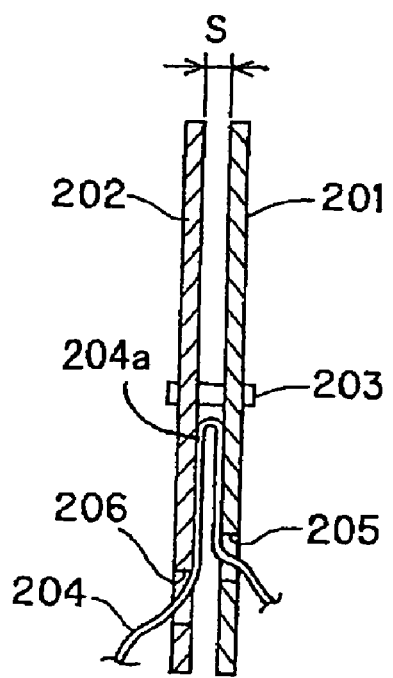
FIG. 17 is a sectional view of the conventional pivot hinge mechanism.

More particularly, the harness 66 is a long flexible printed circuit board (will be referred to as "FPC 66" hereunder) formed to have a predetermined width) as shown in FIG. 14. It includes an intermediate portion 66a bent in the main side to follow up the pivoting of the grip unit 4. As shown in FIG. 15, the FPC 66 is folded back at the bent portion 66a between the first and second openings 40 and 54 overlapping each other, and the bent portion 66a has a curvature radius nearly equal that, about the spindle 34, of the first and second openings 40 and 54.

As shown in FIGS. 11, 12 and 13, the FPC 66 has the bent portion 66a gently folded back in a nearly U shape through the overlapping zone 67 between the first and second openings 40 and 54, and is routed at one end thereof to the main body 2 through the second opening 54 and at the other end thereof to the grip unit 4 through the first opening 40.

The FPC 66 folded back in the overlapping zone 67 will follow up the rotation of the pair of rotating plates 32 and 33 in relation to the stationary plate 31 and have the bent portion 66a thereof shifted within the overlapping zone 67.

At this time, the angle through which the folded-back position of the FPC 66 shown in FIG. 15 is a half of an angle β in which the pair of rotating plates 32 and 33 is rotated in relation to the stationary plate 31 shown in FIG. 11. Therefore, to define the overlapping zone 67 between the first and second openings 40 and 54, at least the angular range between the first and second openings 40 and 54 should be larger than a half of the maximum angle (βm) in which the grip unit 4 is pivoted in relation to the main body 2.

More specifically, to facilitate routing of a connector 68 installed to the FPC 66 after assembling the pivot hinge mechanism 20, the angular range of the first opening 40 is equal to the angular range βm (about 90 deg,) in which the grip unit 4 is pivoted in relation to the main body 2, as shown in FIG. 12. Also, in the first opening 40, a first guard member 69 to protect the FPC 66 is disposed through inside the ring portion 46 of the peripheral annular plate 45 and between the stationary plate 31 and first rotating plate 32.

On the other hand, the angular range of the second opening 54 is 45 deg.+α deg. which is a sum of a half (βm/2) of the maximum angle in which the grip unit 4 is pivoted in relation to the main body 2 and an overlapping angle (α) at which at least a part of the second opening 54 overlaps the first opening 40. Also in the second opening 54, a second guard member 70 to protect the hardness is disposed between the pair of rotating plates 32 and 33.

The first and second openings 40 and 54 partially overlap each other to define the overlapping zone 67 between one end 40a of the first opening 40 and other end 54b of the second opening 54 or between other end 40b of the first opening 40 and one end 54a of the second opening 54 in an angular range in which the pair of rotating plates 32 and 33 is rotated in relation to the stationary plate 31.

As above, since in the pivot hinge mechanism 20, the overlapping zone 67 in which the first and second openings 40 and 54 overlap each other is defined in an angular range in which the grip unit 4 is pivoted in relation to the main body 2, the harness 66 routed between the main body 2 and grip unit 4 can gently be folded back in the overlapping zone 67 and it can easily be routed through the overlapping zone 67.

Also, since in the pivot hinge mechanism 20, the folded-back width of the harness 66 is not influenced by the gap S defined between the stationary plate 31 and first rotating plate 32, the mechanism itself can be thinned more by narrowing the gap S.

The entire digital video camera 1 including such a pivot hinge mechanism 20 can be designed more compact with maintaining the degree of freedom of the harness 66 routed between the main body 2 and grip unit 4. Also, it is possible to prevent the harness 66 from being caught, broken or discontinued when the grip unit 4 is pivoted in relation to the main body 2. Especially in case a double-side flexible printed circuit is used as the harness 66, since it is inferior in bending resistance to the single-side flexible printed circuit board because the number of wires is smaller, it is very advantageous, In the digital video camera 1, since the harness 66 can be routed after assembling the pivot hinge mechanism 20, the manufacturing costs can be reduced.

In the aforementioned digital video camera 1, the stationary plate 31 is installed to the grip unit 4 while the pair of rotating plates 32 and 33 is installed to the main body 2. Reversely, however, the stationary plate 31 may be installed to the main body 2 while the pair of rotating plates 32 and 33 may be installed to the grip unit 4.

Also, the harness 66 may be formed from a halogen-free harness (electric wire) in order to reduce the environmental loading substance instead of the aforementioned FPC. The halogen-free harness is harder than conventional one, and so it is very advantageous.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the pivot hinge mechanism according to the present invention is applicable not only in an imaging device such as digital video camera, digital still camera but also in an electronic apparatus in which a pivotable unit is pivotable in relation to a main body of the apparatus.

The invention claimed is:

1. A pivot hinge mechanism supporting a main body and pivotable unit pivotably in relation to each other, the pivot hinge mechanism comprising:
   a stationary plate attached to one of the main body and pivotable unit;
   rotating plates attached to the other of the main body and pivotable unit; and
   a spindle supporting the rotating plates rotatably about an axis of rotation in relation to the stationary plate,
   the stationary and rotating plates including openings extending completely through the stationary and rotating plates in a direction parallel to the axis of rotation through which openings a harness routed between the main body and rotating portion passes; and
   the opening in the stationary plate and those in the rotating plates being arranged at least partially overlapping each other in the direction parallel to the axis of rotation along an angular range in which the pivotable unit is pivoted in relation to the main body, the opening in the stationary plate and those in the rotating plates being eccentric to the axis of rotation.

2. The pivot hinge mechanism according to claim 1, wherein the opening in the stationary plate and those in the rotating plates have a nearly circular shape having a predetermined width and extending divergently in a predetermined angular range about the spindle.

3. The pivot hinge mechanism according to claim 2, wherein the angular range of the openings in the stationary and moving plates is larger than a half of a maximum angle through which the pivotable unit is pivotable in relation to the main body and smaller than the maximum angle.

4. The pivot hinge mechanism according to claim 1, wherein the harness is a flexible printed circuit board and is configured to be folded back between the openings in the stationary and moving plates in which the folded-back portions of the flexible printed circuit board overlap each other.

5. The pivot hinge mechanism according to claim 1, further comprising a first friction mechanism and second friction mechanism, which provide friction between the rotating and stationary plates at the inner and outer walls thereof.

6. The pivot hinge mechanism according to claim 5, wherein the first friction mechanism includes a leaf spring, pressing plate and friction plate, disposed with the spindle penetrating between the stationary plate and rotating plates,
   the leaf spring being compressed between the stationary and rotating plates and forcing the pressing plate against the friction plate to generate friction.

7. The pivot hinge mechanism according to claim 5, wherein the second friction mechanism includes:
   a peripheral annular plate including a ring portion in sliding contact with a main side of a periphery of the rotating plate, opposite to the stationary plate, and a flange portion projecting from the periphery of the ring portion toward the stationary plate and in a direction in which the diameter of the ring portion is largest and which is attached to the stationary plate; and
   a leaf spring fixed to the stationary plate and compressed between the stationary plate and periphery of the rotating plate,
   the leaf spring compressed between the stationary plate and periphery of the rotating plate pressing the rotating plate whose periphery is thus be forced toward the ring portion of the peripheral annular plate to generate friction.

8. The pivot hinge mechanism according to claim 7, wherein the second friction mechanism includes a second rotating plate supported rotatably on the spindle while catching the ring portion between itself and rotating plate and which is installed integrally to the rotating plate through the ring portion.

9. An imaging device, comprising:
   a main body including therein an imaging unit configured to capture an image of an object;
   a grip unit including therein a recording unit to record the image captured by the imaging unit and installed pivotably to one side of the main body; and
   a pivot hinge mechanism that supports the main body and pivotable unit pivotably in relation to each other,
   the pivot hinge mechanism including a stationary plate attached to one of the main body and pivotable unit, rotating plates attached to the other of the main body and pivotable unit, and a spindle supporting the rotating plates rotatably in relation to the stationary plate about an axis of rotation,
   the stationary and rotating plates including openings extending completely through the stationary and rotating plates in a direction parallel to the axis of rotation through which a harness routed between the main body and rotating portion passes, and the opening in the stationary plate and those in the rotating plates being arranged at least partially overlapping each other in the direction parallel to the axis of rotation along an angular range in which the pivotable unit is pivoted in relation to the main body the opening in the stationary plate and those in the rotating plates being eccentric to the axis of rotation.

10. The imaging device according to claim 9, wherein the opening in the stationary plate and those in the rotating plates have a nearly circular shape having a predetermined width and extending divergently in a predetermined angular range about the spindle.

11. The imaging device according to claim 10, wherein the angular range of the openings in the stationary and moving plates is larger than a half of a maximum angle through which the pivotable unit is pivotable in relation to the main body and smaller than the maximum angle.

12. The imaging device according to claim 9, wherein the harness is a flexible printed circuit board and is configured to be folded back between the openings in the stationary and moving plates in which the folded-back portions of the flexible printed circuit board overlap each other.

13. The imaging device according to claim 12, wherein the flexible printed circuit board is a ribbon and includes a portion bent with a predetermined curvature and is folded back between the openings in the stationary and rotating plates where the bent portions overlap each other.

14. The imaging device according to 13, wherein the curvature radius of the bent portion is nearly equal to that, about the spindle, of the openings in the stationary and rotating plates.

15. The imaging device according to claim 12, wherein the harness is a double-side printed circuit board.

16. The imaging device according to claim 9, further comprising a first friction mechanism and second friction mechanism, which generate friction between the rotating and stationary plates at inner and outer walls thereof.

17. The imaging device according to claim 16, wherein the first friction mechanism includes a leaf spring, pressing plate and friction plate, disposed with the spindle passing between the stationary plate and rotating plates, the leaf spring being compressed between the stationary and rotating plates and forcing the pressing plate against the friction plate to generate friction.

18. The pivot hinge mechanism according to claim 16, wherein the second friction mechanism includes:

a peripheral annular plate including a ring portion in sliding contact with a main side of the periphery of the rotating plate, opposite to the stationary plate, and a flange portion projecting from the periphery of the ring portion toward the stationary plate and in a direction in which the diameter of the ring portion is largest and which is installed to the stationary plate; and a leaf spring fixed to the stationary plate and compressed between the stationary plate and periphery of the rotating plate, the leaf spring being compressed between the stationary plate and periphery of the rotating plate pressing the rotating plate whose periphery is thus forced toward the ring portion of the peripheral annular plate to generate friction.

19. The imaging device according to claim 18, wherein the second friction mechanism includes a second rotating plate supported rotatably on the spindle while catching the ring portion between itself and rotating plate and which is installed integrally to the rotating plate through inside the ring portion.

* * * * *